United States Patent
Hayashi (10) Patent No.: US 6,829,006 B1
(45) Date of Patent: Dec. 7, 2004

(54) IMAGE REPRODUCING APPARATUS WHICH REPRODUCES AN IMAGE FILE FROM AN IMAGE FOLDER

(75) Inventor: Hideto Hayashi, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/382,586

(22) Filed: Aug. 25, 1999

(30) Foreign Application Priority Data

Aug. 26, 1998 (JP) ............................................ 10-239659

(51) Int. Cl.[7] ................................................ H04N 5/76
(52) U.S. Cl. ................................ 348/231.2; 348/231.7
(58) Field of Search ........................ 348/207.99, 207.1, 348/222.1, 231.99, 231.7; 386/108, 109, 117; 707/100, 104.1, 200, 205

(56) References Cited

U.S. PATENT DOCUMENTS

| | | | | |
|---|---|---|---|---|
| 5,806,072 A | * | 9/1998 | Kuba | .......................... 707/200 |
| 6,065,015 A | * | 5/2000 | Kazami | .................... 348/231.7 |
| 6,191,807 B1 | * | 2/2001 | Hamada | .................. 348/14.07 |
| 6,226,449 B1 | * | 5/2001 | Inoue | .......................... 386/120 |
| 6,295,086 B1 | * | 9/2001 | Fukushima | .............. 348/231.1 |
| 6,507,363 B1 | * | 1/2003 | Anderson | ................ 348/231.9 |
| 2002/0090208 A1 | * | 7/2002 | Hatanaka | .................... 386/117 |

FOREIGN PATENT DOCUMENTS

| | | |
|---|---|---|
| JP | 09 102922 | 4/1997 |
| JP | 10 126738 | 5/1998 |

* cited by examiner

*Primary Examiner*—Ngoc-Yen Vu
(74) *Attorney, Agent, or Firm*—Armstrong, Kratz, Quintos, Hanson & Brooks, LLP (57) ABSTRACT

A digital camera includes a memory card. The memory card is recorded with a plurality of image folders. Each of the image folders accommodates a plurality of image files. A CPU detects each image folder name and the number of image files included in the image folder and assigns a relation between them. If a position number of a desired image file is designated, an image folder having the desired image file is designated based on the position number and the number of image files. Thereafter, the desired image file is specified from among the image files included in the specified image folder based on the position number and the number of files. The specified image file is reproduced from the memory card and a desired image is displayed on an LCD.

6 Claims, 6 Drawing Sheets

| N | Dir(N) : IMAGE FOLDER NAME |
|---|---|
| 1 | IM01SANY |
| 2 | IM02SANY |
| 3 | IM04SANY |
| 4 | IM05SANY |
| 5 | IM07SANY |

| N | Dc(N) : NUMBER OF IMAGE FILES |
|---|---|
| 1 | 5 |
| 2 | 4 |
| 3 | 8 |
| 4 | 3 |
| 5 | 6 |

| N | Pic(Z) : IMAGE FILE |
|---|---|
| 1 | SANY0015.JPG |
| 2 | SANY0016.JPG |
| 3 | SANY0019.JPG |
| 4 | SANY0021.JPG |
| 5 | SANY0022.JPG |
| 6 | SANY0024.JPG |

IMAGE REPRODUCING APPARATUS WHICH REPRODUCES AN IMAGE FILE FROM AN IMAGE FOLDER

BACKGROUND OF THE INVENTION

1. Field of the Invention

This invention relates to digital cameras and, more particularly, to a digital camera having folders each accommodating in a scattered fashion image files from among which a desired image file is detectable.

2. Description of the Prior Art

In the conventional digital camera of this kind, if a reproduce mode has been set, the file names for all the image files are read from a memory medium. With these file names, a file name management table is created within an internal memory wherein the file names are sorted in a predetermined order. In the reproduce mode, an image file is reproduced from the recording medium whose file name has been written at the end of the file name management table. Meanwhile, if an operator manipulates a reverse button, reproduction is made on the image file whose file name is positioned precedent by one to the last end of the file name management table. In this manner, it has been a conventional practice to created a file name management table having all the file names listed therein so that a desired image file can be reproduced with reference to this file name management table.

In the prior art, however, there encounters increase in the number of image files as the memory medium increases in capacity. This, in turn, results in increase in size of a file name management table that is required in a reproduce mode. Consequently, the memory medium capacity, if increased, has required to increase the capacity of the internal memory.

SUMMARY OF THE INVENTION

It is therefore an object of the present invention to provide a digital camera which can suppress an internal memory from increasing in capacity.

According to the present invention, a digital camera having a memory medium recorded with a plurality of image folders from which a desired image file is detected and reproduced, comprises: a folder identification number detection means for detecting folder identification numbers of the image folders; a first number of files detection means for detecting, a first number of image files accommodated in each of the image folders; a designation means for designating a position number of the desired image file; an image folder specifying means for specifying a desired image folder accommodating the desired image file based on the folder identification number, the first number of files and the position number; a file identification number detection means for detecting a file identification number of an image file accommodated in the desired image folder; and an image file specifying means for specifying the desired image file from the desired image folder based on the file identification number, the first number of files and the position number.

The identification number detection means detects folder identification number of image folders, while the first number of files detection means detects, on an each image folder basis, a first number of files of the image files accommodated in the image folders. If a position number of a desired image file is designated by the designation means, the image folder specifying means specifies a desired image folder accommodating therein the desired image file based on the folder identification number, the first number of files and the position number. Furthermore, the file identification number detection means detects a file identification number of an image file accommodated in the desired image folder. If a file identification number is detected, the image file specifying means specifies a desired image file from the desired image folder based on the file identification number, the first number of files and the position number.

According to the present invention, a desired image folder is first specified based on the folder identification number, the first number of files and the position number, and then a desired image file is specified based on the file identification number, the first number of files and the position number. Accordingly, there is no necessity to read out all the file names. This can suppress the internal memory from increasing in capacity.

In one aspect of the invention, the position number of the desired image file represents a same value as a second number of files of from a top image file to the desired image file when the image files are arranged according to the file identification number.

In one embodiment of the invention, the image folder specifying means specifies a desired image folder, as follows. First, a comparison means compares the second number of files with the first number of files in an order according to the folder identification number. If the second number of files is greater than a current first number of files, a subtraction means subtract the current first number of files from the second number of files and updating the second number of files. On the other hand, if the second number of files is equal to or less than the current first number of files, an image folder determining means determines an image folder corresponding to the current first number of files as the desired image folder. The image files specifying means specifies the desired image file by a second number of files updated by the subtraction means and the file identification number.

In another aspect of the invention, an image folder reproduce means reproduces the desired image file specified by the image file specifying means, and a monitor displays an image corresponding to the desired image file.

According to this invention, a digital camera, comprises: a set means for setting a reproduce mode; a folder name detection means for detecting folder names of a plurality of image folders recorded on a recording medium; a folder name specifying means for specifying a predetermined folder name from among the folder names; a file name detection means for detecting file names of a plurality of image files accommodated in an image folder having the predetermined folder name; a file name specifying means for specifying a predetermined file name from among the file names; and a file reproduce means for reproducing a predetermined image file having the predetermined file name from the recording medium.

If a reproduce mode is set, folder names of folders recorded on the memory medium are detected by the folder name detection means. The folder name specifying means specifies a predetermined folder name from among the detected folder names. The file name detection means detects file names of the image files accommodated in the image folder having the predetermined folder name. The file name specifying means specifies a predetermined file name from among the detected file names. The file reproduce means reproduces the predetermined image file having the predetermined file name from the memory medium.

According to the present invention, the image file with a predetermined file name is specified from among the image files accommodated in the image folder with a predetermined folder name. This eliminates the necessity to read out all the image files. As a consequence, it is possible to suppress the internal memory from increasing in capacity. Also, the time can be shortened from setting a reproduce mode to reproducing a predetermined image file.

In one embodiment of the invention, the folder names and the file names respectively include a folder identification number and a file identification number, and the predetermined folder name and the maximum file name respectively having a maximum folder identification number and a maximum file identification number.

In one aspect of the invention, a first creating means creates a folder name management table having the folder names sorted in a first predetermined order; and a second creating means creates a file name management table having the file names sorted in the first predetermined order. The folder name specifying means specifies a folder name positioned in a predetermined position in the folder name management table as the predetermined folder name, and the file name specifying means specifying a file name positioned in the predetermined position in the file name management table as the predetermined file name. Incidentally, the predetermined position is at an end of the table.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
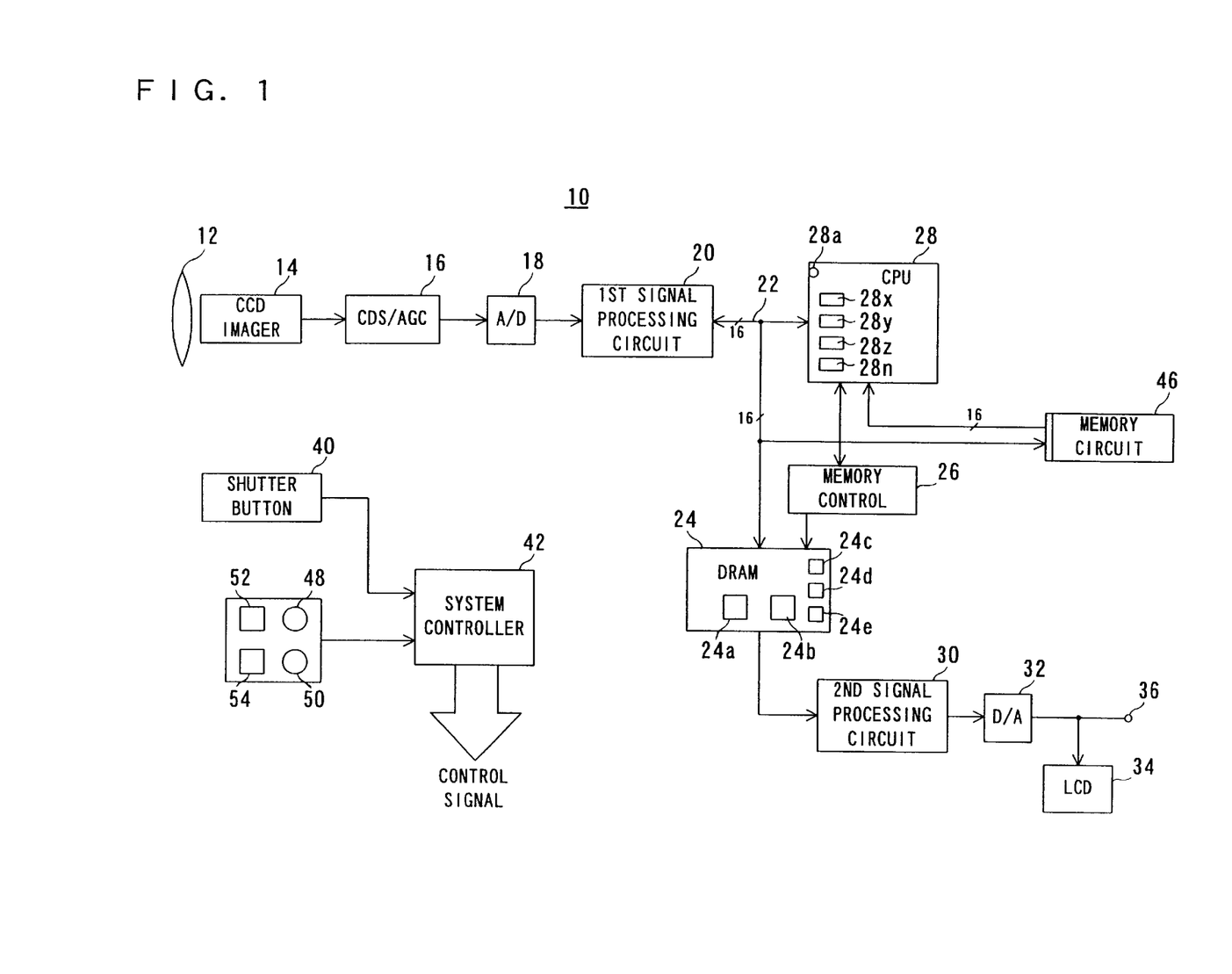
FIG. 1 is a block diagram showing one embodiment of the present invention.

Referring to FIG. 1, a digital camera 10 of this embodiment includes a lens 12. An optical image given from the lens 12 is introduced through a color filter (not shown) onto a CCD imager.

If an operator operates a reproduce/shoot switch 54 to a picture shoot side, a picture shoot mode is set wherein motion images are displayed real time on an LCD 34. At this time, the CCD imager 14 outputs pixel signals continuously in a progressive scan scheme. The pixel signals outputted by the CCD imager 14 are subjected to well-known noise removal and level adjustment by a CDS/AGC circuit 16. The pixel signals processed by the CDS/AGC circuit 16 are then converted into digital data, or pixel data, by an A/D converter 18. A first signal processing circuit 20 performs color separation and YUV conversion on the pixel data outputted from the A/D converter 18.

The Y, U and V data thus created is written by a memory control circuit 26 onto a memory area 24a of a DRAM 24 through a bus 22. The data having been written on the memory area 24a is in a progressive scan data form, and it if in its form cannot be outputted as an image through the interlace-scan-schemed LCD 34. For this reason, the memory control circuit 26 temporarily writes the Y, U and V data to the memory area 24a. The same memory control circuit 26 can read out Y, U and V data through an interlace scan scheme.

During outputting motion images, a second signal processing circuit 30 performs predetermined horizontal and vertical interpolations on the Y, U and V data (motion image data) read from the DRAM 24 in order to adapt the data to a screen size of the LCD 34. The motion image data outputted from the second signal processing circuit 30 is then converted into an analog signal by a D/A converter 32, and supplied to the LCD 34 and at the same time outputted through an output terminal 36. As a result, a subject motion images are displayed real time on the LCD 34. That is, in the picture shoot mode the LCD 34 serves as a viewfinder.

If a shutter button 40 is pressed by the operator, a system controller 42 supplies a control signal to a CPU 28 through an interrupt terminal 28a thereof. The CPU 28 disables the CCD imager 14 after the CCD imager 14 has outputted 1 frame of pixel signals. That is, the CCD imager 14 is disabled at a time of outputting 1 frame of shot image signal obtained upon depressing the shutter button 40. The CDS/AGC circuit 16 performs noise removal and level adjustment on the shot image signal, similarly to the above. The A/D converter 18 converts an output of the CDS/AGC circuit 16 into digital data, or shot image data. The shot image data created by the A/D converter 18 is directly supplied onto the bus 22 without processing by the first signal processing circuit 20, and written onto the memory area 24a by the memory control circuit 26.

The CPU 28 performs color separation, YUV conversion and APEG compression on the shot image data stored in the memory area 24a, by using a work area 24b. Thus, created is an image file put with a file name "SANY * * * *. JPG". The CPU 18 further accommodates the created image file in an image folder having a folder name "IMAGE * * SANY", and records the image file on a memory card 46.

The image folder is created in plurality of number so that an operator can control image files in a scattered fashion. Each image folder accommodates 1 or 2 or more image files. The file name includes "* * * *" as a file identification number of 4 figures that are incremented according to a picture taking order. The folder name includes "* *" as a folder identification number of 2 figures that is incremented in a image folder creating order.

Incidentally, there is a digital camera format called exif. With this format, a plurality of image files can be accommodated in a plurality of image folders, in a scattered fashion. Also, the file name is defined by 8 characters. This embodiment meets the requirement of the exif format.

Figure 2:
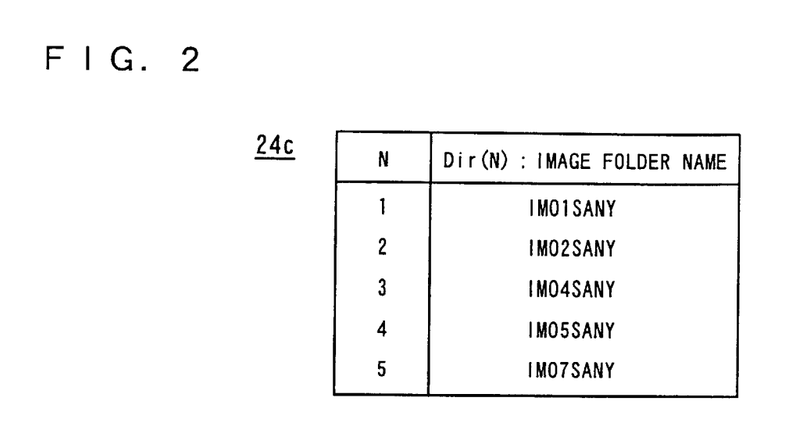
FIG. 2 is an illustrative view showing a folder management table.

If the reproduce/shoot switch 54 is switched to a reproduce side, then a reproduce mode is set. Thereupon, the CPU 28 detects for a folder name "IMAGE * * SANY" from the memory card 46, and sort detected folder names according to the folder identification numbers. The sorted folder names are assigned by respective management numbers N that are incremented from "1". That is, a folder name management table 24c as shown in FIG. 2 is created within the DRAM 24.

Figure 3:
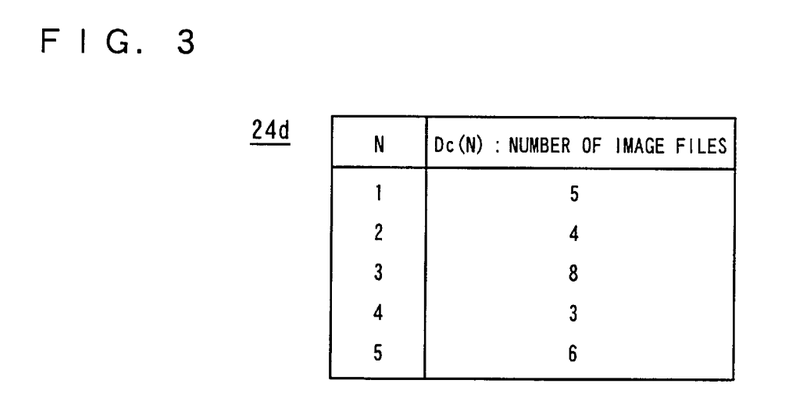
FIG. 3 is an illustrative view showing a file number management table.

The CPU 28 also detects the number of image files accommodated in each image folder, and creates a file number management table 24d as shown in FIG. 3 within the DRAM 24. The respective ones of the number of files are also assigned by management numbers N. This management number N provides a relation between a folder name management table 24c and a file number management table 24d. As a consequence, the number of image files accommodated in each image folder can be grasped by referring to the folder name management table 24c and file number management table 24d.

Figure 4:
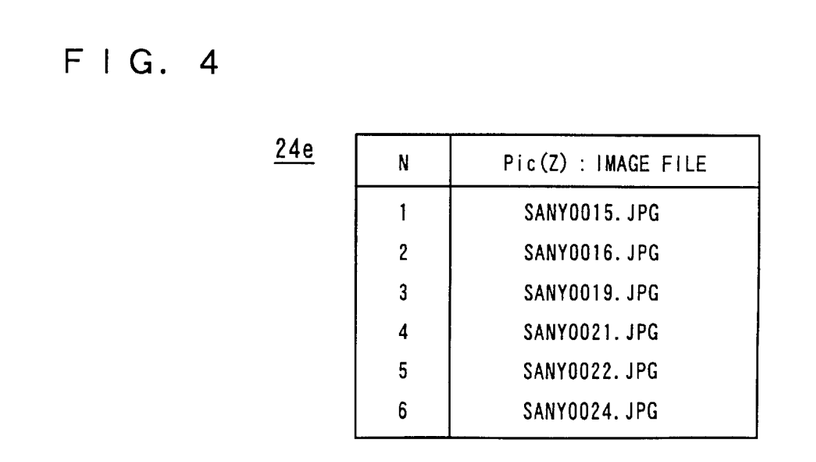
FIG. 4 is an illustrative view showing a file name management table.

The CPU 28 further makes reference to a folder name management table 24c and specifies an image folder that is greatest in folder identification number, and detects file names of image files included in the specified image folder. The detected file names are sorted according to the file identification number. Respective management numbers Z, incrementing from "1", are assigned to the file names. As a consequence, a file name management table 24e is created as shown in FIG. 4 within the DRAM 24.

Thereafter, detected is a file name having a greatest file identification number from among those of the file name management table 24e. The image file having a detected file name is reproduced from the memory card 46. The reproduced image file is decompressed using the work area 24c. The decompressed shot image data (YUV data) is stored in the memory area 24a. Thereafter, the shot image data is read out by the memory control circuit 26. The second signal processing circuit 30 performs horizontal and vertical interpolations on the read shot image data. As a result, a corresponding shot picture is displayed on the LCD 34.

The image file position number is defined by the number of files from a head image file down to a desired image file where the image files accommodated in each image folder be arranged in an order of increasing the file identification number. Consequently, the position number for an image file to be reproduced immediately after setting a reproduce mode is equal to a sum of the number of image files.

If the operator manipulates the forward button 48 or reverse button 50, update is made on the position number of an image file to be reproduced. Where a file name of a desired image file exists in a file name management table 24e, the file name of a desired image file is detected from the same file name management table 24e based on the updated file number.

However, if there is no desired file name in the file name management table 24e, a desired image folder (image folder accommodating a desired image file) is first specified based on the updated position number and the number of files of each image folder. Then, a desired image file is specified from among the image files accommodated in the desired image folder. Specifically, the position number is compared with each of numerals in the file number management table 24d, to first specify a desired image folder. The file name management table 24e is updated by file names of the image files accommodated in the desired image folder. Thereafter, the updated file name management table 24e is referred to specify a desired image file. The image file thus specified is reproduced, similarly to the above. Finally, the desired image is displayed on the LCD 34.

When a reproduce mode is set, the CPU 28 processes a flowchart shown in FIG. 5 to FIG. 8. The CPU 28 in step S1 first reads all the folder names out of the memory card 46, and extracts folder names having an identifier "IM" from the read folder names. In step S5 the extracted folder names are sorted in an order of increasing folder identification number, thereby creating a folder name management table 24c as shown in FIG. 2. Because in this embodiment there is five folder names having an identifier "IM", respective management numbers N of "1"–"5" are assigned to the folder names.

Figure 5:
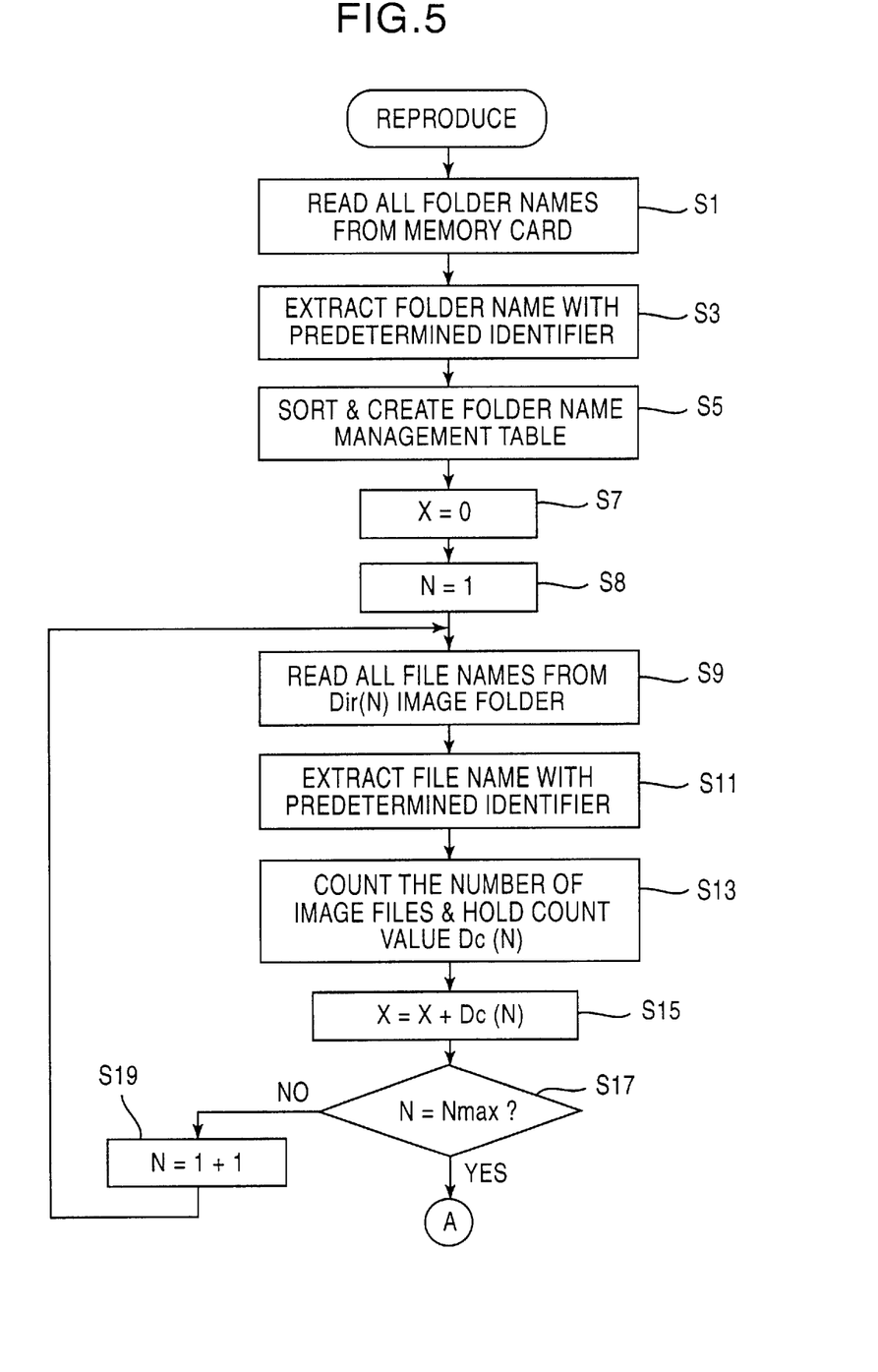
FIG. 5 is a flowchart showing one part of operation in the FIG. 1 embodiment.
Figure 6:
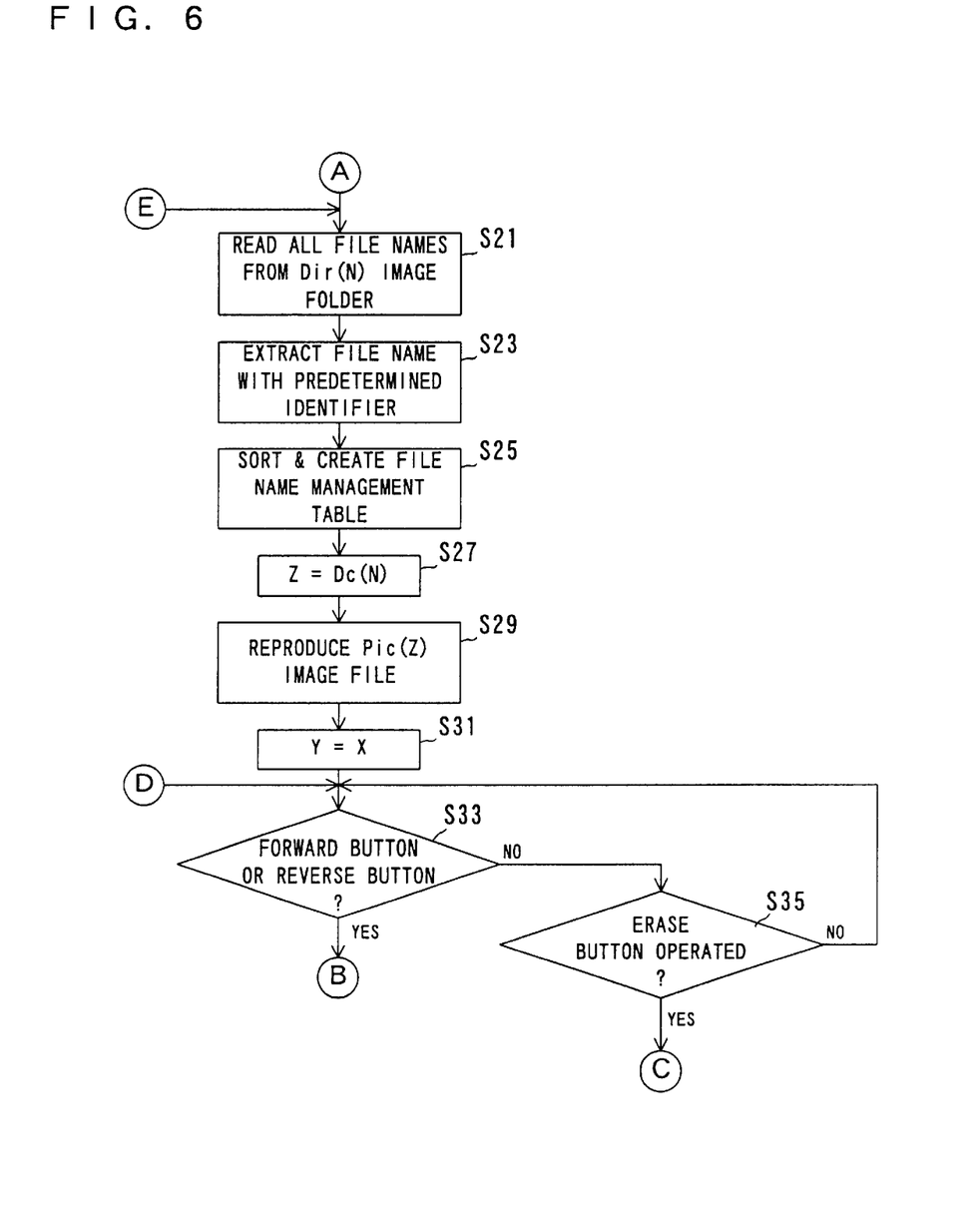
FIG. 6 is a flowchart showing another part of operation in the FIG. 1 embodiment.
Figure 7:
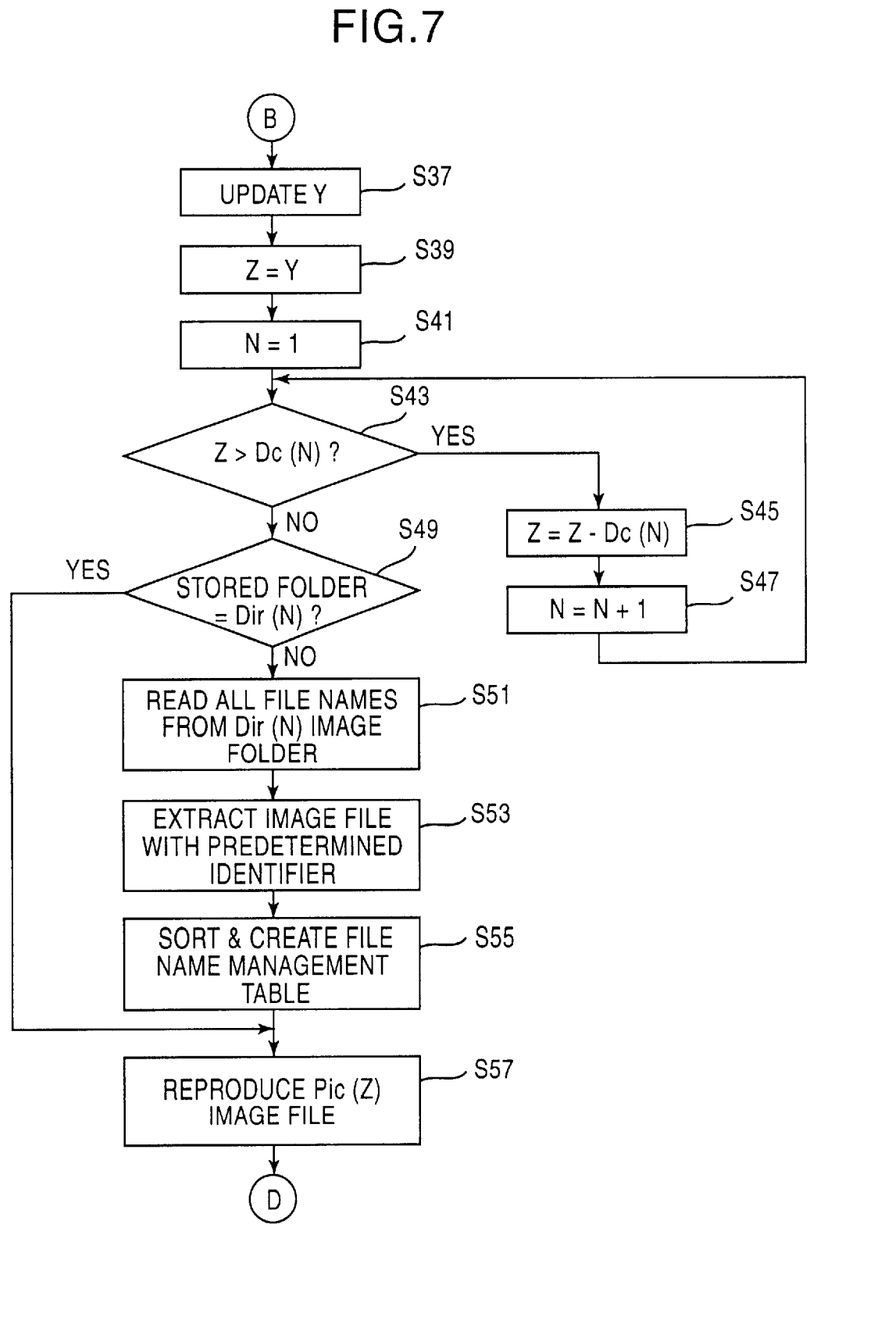
FIG. 7 is a flowchart showing still another part of operation in the FIG. 1 embodiment.
Figure 8:
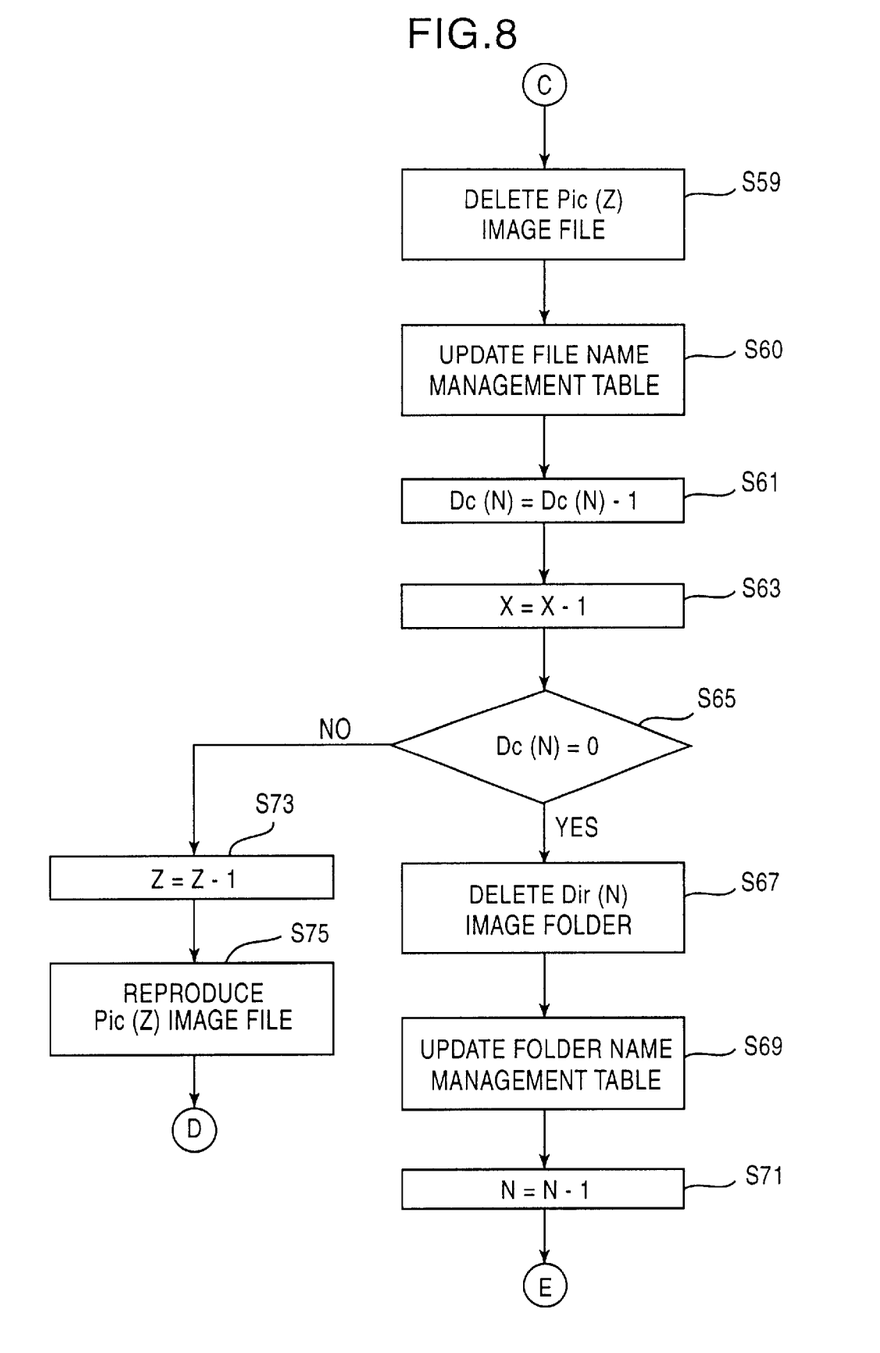
FIG. 8 is a flowchart showing another part of operation in the FIG. 1 embodiment.

The CPU 28 in step S7 sets the count value (the total number of files) X of the counter $28x$ to "0", and in step S8 sets the count value (management number) N of the counter $28n$ to "1". In step S9 all the file names are read out of an image folder corresponding to the count value N. That is, reference is made to the folder name management table 24c to detect folder name Dir(N). All the file names are read out of an image folder recorded on the memory card 46 and having the same folder name. Subsequently, in step S11 file names having an identifier "SANY" are extracted from the read file names. In step S13 the number of the extracted image files is counted, and the counted number of files is assigned to a management number of a file number management table 24d shown in FIG. 3. Thereafter, in step S15 the number of files counted this time is added to the total number of files X, and the new total number of files X is set in the counter $28x$.

When the count value N is "1", file names are read from an image file "IM01SANY" and the number of file names is counted that have an identifier "SANY". In this embodiment the number of files is "5" and this value "5" is written to a corresponding site to the count value N=1 in the file number management table 24d.

In step S17 it is determined by referring the folder name management table 24c whether the count value N is an maximum value or not. If "NO" here, in step S19 the count value N is incremented and the process returns to the step S9. However, if "YES", the process advances to step S21. In this manner, a file number management table 24d is created as shown in FIG. 3 wherein the respective numbers of files are related to the folder names in the folder name management table 24c shown in FIG. 2. That is, the corresponding image folder name and number of image files to each other are assigned by a common management number N, the tables 24c and 24d are related through the management number N. By referring to both the folder name management table 24c and the file number management table 24d, it is possible to grasp the number of image files accommodated in each image folder.

In step S21 all the file names are read out of an image folder to which a current count value N of the memory card 46 corresponds. Then, in step S23 file names having an identifier "SANY" are extracted. That is, the processes of the steps S21 and S23 are the same as those of the steps S9 and S11. If predetermined file names have been extracted, the CPU 28 in step S25 sorts these file names to create a file name management table 24e as shown in FIG. 4. Specifically, the file names are sorted in an order of increasing the file identification number, and the sorted file names are put in correspondence to respective management numbers Z having a number incremented from "1". Because the current count value N is "5", reading of file names is made on an image folder having a folder name "IM07SANY" shown in FIG. 2. Thus, a file name management table 24e is created as shown in FIG. 4.

In step S27 the counter $28z$ is set by the number of files Dc (N) corresponding to the current count value N. The counter $28z$ has "6" as a count value (management number) Z. Then, in step S29 the file name management table 24e is referred, to reproduce from the memory card 46 an image file corresponding to the count value Z (=6), i.e. image file "SANY0024. JPG". Immediately after setting a reproduce mode, the image file "SANY0024. JPG" having the greatest file identification number is detected and reproduced from the image folder "IM07SANY" having the greatest folder identification number.

The CPU 28 in step S31 subsequently sets a total number of files X to the counter 28y. Thus, the count value of counter 28y is made equal to a total number of files. It is then determined in step S33 whether the forward button 48 or reverse button 50 has been operated, and in step S35 it is determined whether the erase button 52 has been pressed. If "YES" in the step S33, the process advances to step S37. If "YES" in the step S35, the process advances to step S59.

In step S37 the count value Y is updated responsive to button operation. This count value Y is a position number for the desired image file. In step S39 the counter 28z is updated such that count value Z=count value Y is obtained. In step S41 the count value N is set to "1". Then, in step S43 the count value Z is compared with the number of files Dc (N). If Z>Dc (N), the image folder Dir (N) is not a desired image folder. Due to this, the CPU 28 in step S43 determines "YES", and in step S45 takes a new count value Z by subtracting the number files Dc (N) from the count value Z. Furthermore, in step S47 the count value N is incremented and the process returns to the step S43. In this manner, the count value Z is subtracted by respective ones of number of files Dc (N) until Z≦Dc (N) is reached.

In the case that the position number, i.e. initial count value, is "23", the count value Z is subtracted by the corresponding number of files "5" to N=1. The count value Z (=18) after subtraction is greater than the next number of files "4", "4" is further subtracted from "18". In this manner, subtraction is repeated until the count value N becomes "5", that is, until the count value Z becomes "3".

If Z≦Dc (N) is reached, the image folder Dir (N) becomes a desired image folder. Due to this, the CPU 28 determines in step S49 whether the image folder Dir (N) coincides with a stored image folder (the image folder having a file name already stored in the file name management table 24e). If "YES", there is no need to read out file names, and the process proceeds as it is to step S57. If "NO", in steps S51–S55 the similar process is performed to that of the steps S21–S25 and then the process advances to the step S57. As a result, the file names included in the desired image folder and having an identifier "SANY" are written in an order of increasing the file identification number into the file name management table 24e, thus being put in correspondence to management numbers Z.

As a result of repeated subtractions from the count value Z, a file name of a desired image file is given by a corresponding file name in the file name management table 24e to the current count value Z. If the current count value is "3", the desired image file is given by a file "SANY0019JPG". After the desired image file has been specified in this manner, the CPU 28 in step S57 reproduces the specified image file. Consequently, a desired picture is displayed on the LCD 34. After ending the process of the step S57, the process returns to the step S33.

If the operator presses the erase button 52, the CPU 28 determines "YES" in step S35, and in step S59 deletes the image file corresponding to the count value Z from the memory card 46. Then, in step S60 the file name management table 24e is updated, and in respective steps S61 and S63 the number of files Dc (N) and the total number of files X are decremented. It is determined in step S65 whether the number of files Dc (N) has become "0" or not. If "YES" here, in step S67 the image folder Dir (N) is deleted from the memory card 46, and in step S69 the folder name Dir (N) is deleted from the folder name management table 24c. Then, in step S71 the count value N is decremented, and the process returns to the step S21. On the other hand, if "NO" in step S65, then in step S73 the count value Z is decremented, and in step S75 the image file corresponding to the current count value Z is reproduced, returning to the step S33.

Incidentally, even in the case that "YES" is determined in the step S65, an image file reproduction process is carried out in the step S29. As a result, when the erase button 52 is pressed, an image file precedent by one is reproduced.

According to this embodiment, the folder names having a predetermined identifier are all written into the folder name management table 24c. However, the file name to be written in the file name management table 24e is limited to the file names of the image files that are accommodated in a desired image folder and have a predetermined identifier. Due to this, the memory capacity required for image file management can be reduced, as compared to the prior art wherein all the file names having a predetermined identifier are written into the file name management table. Also, because the amount of data to be read out is less, it is possible to shorten the time from reproduce mode setting to image file reproduction.

Incidentally, in this embodiment a desired image file was updated in position number by operating the forward button 48 or reverse button 50. Alternatively, a ten key may be newly provided so that the position number can be updated by operating the ten key.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reproducing apparatus, comprising:
   a folder identification number detector for detecting folder identification numbers which respectively identify image folders recorded in a memory medium;
   a first number detector for detecting a first number which is the number of image files accommodated in each of said image folders;
   a designator for designating a position number of a desired image file;
   an image folder specifier for specifying a desired image folder which is an image folder accommodating said desired image file based on said folder identification numbers, said first number and said position number;
   a file identification number detector for detecting, in response to a designating of the position number by said designator, file identification numbers which respectively identify image files accommodated in said desired image folder; and
   an image file specifier for specifying said desired image file from said desired image folder based on said file identification numbers, said first number and said position number.

2. An image reproducing apparatus according to claim 1, wherein said position number represents a second number which is the number of image files of from a top image file to said desired image file when said image files are arranged according to said file identification numbers.

3. An image reproducing apparatus according to claim 1, further comprising:
- an image folder reproducer for reproducing said desired image file specified by said image file specifier; and
- a monitor for displaying an image corresponding to said desired image file.

4. An image reproducing apparatus comprising:
- a folder identification number detector for detecting folder identification numbers which respectively identify image folders recorded in a memory medium;
- a first number detector for detecting a first number which is the number of image files accommodated in each of said image folders;
- a designator for designating a position number of a desired image file;
- an image folder specifier for specifying a desired image folder which is an image folder accommodating said desired image file based on said folder identification numbers, said first number and said position number;
- a file identification number detector for detecting file identification numbers which respectively identify image files accommodated in said desired image folder; and
- an image file specifier for specifying said desired image file from said desired image folder based on said file identification numbers, said first number and said position number,
- wherein said position number represents a second number which is the number of image files of from a top image file to said desired image file when said image files are arranged according to said file identification numbers,
- wherein said image folder specifier includes a comparer to compare said second number with said first number in an order according to said folder identification numbers, a subtractor for subtracting, when said second number is greater than a current first number, said current first number from said second number so as to update said second number, and an image folder determiner for determining an image folder corresponding to said desired image folder when said second number is less than said current first number.

5. An image reproducing apparatus according to claim 4, wherein said image file specifier specifies said desired image file based on said second number updated by said subtractor and said file identification numbers.

6. An image reproducing apparatus, comprising:
- a first number detector for detecting a first number which is the number of image files accommodated in each of image folders;
- a designator for designating a position number of a desired image file;
- an image folder specifier for specifying a desired image folder which is the image folder accommodating said desired image file based on said first number and said position number;
- an image file detector for detecting, in response to a designating of the position number by said designator, the image files accommodated in said desired image folder; and
- an image file specifier for specifying said desired image file from among the image files detected by said image file detector based on said first number and said position number.

* * * * *